3,072,648
N-[4-PHENYL-5,6-DIHYDRO - 1(2H) - PYRIDYLAL-
KYL] - 3,4,5 - TRIMETHOXY - BENZAMIDES AND
-CINNAMAMIDES
Guido Eros Bonvicino, Pearl River, N.Y., assignor to
American Cyanamid Company, New York, N.Y., a corporation of Maine
No Drawing. Filed Dec. 22, 1960, Ser. No. 77,518
4 Claims. (Cl. 260—240)

This invention relates to certain amides of 1-(aminoalkyl) derivatives of 4-phenyl-1,2,3,6-tetrahydropyridine and, more particularly, is concerned with novel compounds which may be represented by the following general formula:

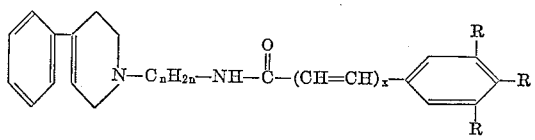

wherein R is lower alkoxy, $x$ has the value of 0 or 1, and $n$ is an integer from 2 to 5. Suitable lower alkoxy substituents are methoxy and ethoxy. In the foregoing general formula, —$C_nH_{2n}$— represents a lower alkylene radical separating the groups attached thereto by at least 2 carbon atoms. The —$C_nH_{2n}$— radical therefore represents a polymethylene radical such as ethylene, trimethylene, tetramethylene or pentamethylene, or it represents one of the radicals isomeric therewith such as methylethylene, ethylethylene, methylpropylene, ethylpropylene or methylbutylene, subject to the limitation that at least 2 carbon atoms are interposed between the groups attached to the alkylene radical.

The organic bases of this inventtion form nontoxic, acid-addition and quaternary ammonium salts with a variety of organic and inorganic salt-forming reagents. Thus, acid-addition salts, formed by admixture of the organic free base with an acid, suitably in a neutral solvent, are formed with such acids as sulfuric, phosphoric, hydrochloric, hydrobromic, sulfamic, citric, lactic, malic, succinic, tartaric, acetic, benzoic, gluconic, ascorbic and related acids. Quaternary ammonium salts may be formed by reaction of the free bases with a variety of organic esters of sulfuric, hydrohalic, and aromatic sulfonic acids. The organic esters employed for quaternary ammonium salt formation are preferably lower alkyl halides. However, other organic esters are suitable for salt formation, and may be selected from among a diverse class of compounds including benzyl chloride, phenethyl chloride, naphthylmethyl chloride, dimethyl sulfate, methyl benzenesulfonate, ethyl toluenesulfonate, allyl chloride, methallyl bromide and crotyl bromide. For purposes of this invention the free bases are equivalent to their non-toxic acid-addition and quaternary ammonium salts.

The novel compounds of the present invention are, in general, white crystalline solids which may be purified by distillation under reduced pressure. They are generally insoluble in water, but relatively soluble in organic solvents such as lower alkanols, esters, ethers, ketones, benzene, toluene, chloroform, and the like. The acid-addition and quaternary ammonium salts of the organic bases of the present inventtion are, in general, crystalline solids, relatively soluble in water, methanol and ethanol, but relatively insoluble in non-polar organic solvents such as ether, benzene, toluene and the like.

The novel compounds of the present invention have useful pharmacological properties. They are depressants of the central nervous system, and upon administration they produce a state of tranquility in man and animals with minimum side effects. These compounds also are effective in reducing gastric acidity, and are hypotensive agents. The dosage required to produce a tranquilizing effect without noticeable toxic side effects varies between about 50 mg. and 500 mg. per individual dose. The dosage regimen may be adjusted to provide the optimum therapeutic response. For example, several doses may be administered daily, or the dose may be proportionately reduced as indicated by the exigencies of the therapeutic situation.

The novel compounds of the present invention may be readily prepared by the interaction of an appropriate 1-(aminoalkyl) derivative of 4-phenyl-1,2,3,6-tetrahydropyridine with a reactive derivative of a 3,4,5-trialkoxybenzoic acid or of a 3,4,5-trialkoxycinnamic acid, such as the acid halide, acid anhydride, or ester.

The conversion of the 3,4,5-trialkoxybenzoic and 3,4,5-trialkoxycinnamic acids to the corresponding acid halides may be carried out by means of various reagents. For this purpose there may be used phosphorus trichloride, phosphorus tribromide, phosphorus pentachloride, phosphorus pentabromide, phosphorus oxychloride, sulfuryl chloride or thionyl chloride. However, I prefer to use thionyl chloride for the preparation of the corresponding intermediate acid chlorides. The reaction may be carried out at temperatures ranging from about 20° C. to about 100° C. in the absence of a solvent or in a solvent which will not enter into the reaction under the conditions employed. Such solvents may be, for example, chloroform, methylene chloride, benzene, and the like. The resulting acid halide is then treated with a 1-(aminoalkyl) derivative of 4-phenyl-1,2,3,6-tetrahydropyridine whereby the corresponding amide is obtained. This reaction may be carried out at temperatures ranging from about 0° C. to about 100° C. For convenience, it is preferred to carry out the reaction in a solvent which will not enter into the reaction under the conditions employed. Solvents which may be used are, for example, benzene, toluene, ether, tetrahydrofuran, and the like. An acid acceptor such as sodium hydroxide, sodium carbonate, or potassium carbonate may also be employed. In some cases the 1-(aminoalkyl) derivative of 4-phenyl-1,2,3,6-tetrahydropyridine may act as its own acid acceptor by employing a two-fold excess thereof.

The conversion of the 3,4,5-trialkoxybenzoic and 3,4,5-trialkoxycinnamic acids to the corresponding acid anhydrides may be readily achieved by the interaction of a 3,4,5-trialkoxybenzoic acid or a 3,4,5-trialkoxycinnamic acid with its corresponding acid halide. The resulting acid anhydride is then treated with a 1-(aminoalkyl) derivative of 4-phenyl-1,2,3,6-tetrahydropyridine whereby the corresponding amide is obtained. This reaction may be carried out at temperatures ranging from about 50° C. to about 100° C. Solvents which may be used are, for example, chloroform, toluene, tetrahydrofuran, and the like.

The lower alkyl esters of the 3,4,5-trialkoxybenzoic acids or 3,4,5-trialkoxycinnamic acids may be readily prepared by standard esterification procedures. The amidation of these intermediate esters may be brought about by treatment with an appropriate 1-(aminoalkyl) derivative of 4-phenyl-1,2,3,6-tetrahydropyridine under conditions well known in the art.

The preparation of the intermediate 1-(aminoalkyl) derivatives of 4-phenyl-1,2,3,6-tetrahydropyridine may be readily achieved by the reduction of the corresponding 1-(cyanoalkyl) derivatives of 4-phenyl-1,2,3,6-tetrahydropyridine. This reduction may be accomplished either catalytically or by the use of lithium aluminum hydride. The latter reduction is ordinarily carried out in an inert solvent such as ether, dioxane, tetrahydrofuran, and the like. The intermediate amine may be isolated and purified either by distillation or by the preparation of an acid-addition salt.

The intermediate 1-(cyanoalkyl) derivatives of 4-phenyl-1,2,3,6-tetrahydropyridine may be readily prepared by the interaction of an appropriate cyanoalkyl halide and 4-phenyl-1,2,3,6-tetrahydropyridine. This reaction is carried out in an inert solvent such as ether, benzene, toluene, tetrahydrofuran, and the like, in the presence of an acid acceptor. An excess of 4-phenyl-1,2,3,6-tetrahydropyridine may be advantageously utilized as the acid acceptor. However, an alkali metal hydroxide, alkoxide, or carbonate may also be employed. This reaction may be carried out at temperatures ranging from about room temperature to reflux temperatures. The intermediate nitrile may be isolated by filtering the reaction mixture, followed by removal of filtrate solvent by evaporation, and distillation of the residue. Alternatively, the intermediate 1-(cyanoalkyl) derivatives of 4-phenyl-1,2,3,6-tetrahydropyridine may be prepared by the interaction of an alkylene dihalide and 4-phenyl-1,2,3,6-tetrahydropyridine under reaction conditions such as those employed with a cyanoalkyl halide. The resulting 1-(haloalkyl) derivatives of 4-phenyl-1,2,3,6-tetrahydropyridine may then be converted to the intermediate nitriles by treatment with an alkali metal cyanide according to standard procedures.

Alternatively, the novel compounds of the present invention may be prepared by metallating the amide of a 3,4,5-trialkoxybenzoic acid or of a 3,4,5-trialkoxycinnamic acid, e.g. with sodium amide or lithium amide, and then reacting the metallated amide with an appropriate 1-(haloalkyl) derivative of 4-phenyl-1,2,3,6-tetrahydropyridine. This reaction may be carried out in an inert solvent such as ether, dioxane, tetrahydrofuran, and the like, at temperatures ranging from about 0° C. to about 80° C.

The invention will be described in greater detail in conjunction with the following specific examples:

EXAMPLE 1

*4-(4-Phenyl-5,6-Dihydro-1(2H)-Pyridyl)Butyronitrile*

A mixture of 80 g. (0.5 mole) of 4-phenyl-1,2,3,6-tetrahydropyridine and 37 g. (0.25 mole) of 4-bromobutyronitrile in 500 ml. of ether is stirred at room temperature for 18 hours. The hydrochloride of 4-phenyl-1,2,3,6-tetrahydropyridine is filtered off and the filtrate is heated under reflux for 8 hours. More of the hydrochloride of 4-phenyl-1,2,3,6-tetrahydropyridine is filtered off and the filtrate is evaporated to dryness and distilled. The product boils at 156–160° C./0.3 mm. and a yield of 35 g. (62%) is obtained.

The hydrobromide salt of the product is prepared in an alcoholic solution by adding one equivalent of 48% hydrobromic acid and diluting the solution with ether to the cloud point. The crystalline salt, M.P. 184–186° C., is isolated in 40% yield after recrystallization from alcohol-ether.

EXAMPLE 2

*1-(4-Aminobutyl)-4-Phenyl-1,2,3,6-Tetrahydropyridine*

Lithium aluminum hydride, 10g. (0.263 mole) in 500 ml. of anhydrous tetrahydrofuran is refluxed with stirring for 30 minutes. The suspension is then treated dropwise with 40.2 g. (0.178 mole) of 4-(4-phenyl-5,6-dihydro-1(2H)-pyridyl)butyronitrile in 100 ml. of anhydrous tetrahydrofuran while the mixture is stirred and heated under gentle reflux. The reaction mixture is then heated under reflux for one hour and cooled in an ice bath. The reaction complex is decomposed by the dropwise addition of 10 ml. of water followed by 10 ml. of 15% sodium hydroxide and finally 30 ml. of water. After 15 minutes the mixture is filtered and the filtrate is evaporated to dryness. The residue is distilled at 135–136° C./0.2 mm., $n_D^{28}$ 1.5575. The crude yield is 39.5 g. (96.4%).

The dihydrobromide salt is prepared by dissolving an aliquot of the crude product in ethanol, adding two equivalents of 48% hydrobromic acid, and diluting the solution with ether to the cloud point. The recrystallized salt melts at 210–220° C. dec.

EXAMPLE 3

*N-[4-(4-Phenyl-5,6-Dihydro-1(2H)-Pyridyl)Butyl]-3,4,5-Trimethoxybenzamide*

3,4,5-trimethoxybenzoyl chloride, 8.2 g. (0.0356 mole) is dissolved in 200 ml. of benzene and a solution of 8.2 g. (0.0356 mole) of 1-(4-aminobutyl)-4-phenyl-1,2,3,6-tetrahydropyridine in 60 ml. of benzene is added dropwise over a 15 minute period. The reaction mixture is then stirred and heated under reflux for 3 hours. The mixture is then cooled and the hydrochloride salt of the product is collected by filtration. The yield is 14.7 g. (95%), M.P. 198–206° C. The salt is purified by dissolving it in 200 ml. of hot anhydrous ethanol, the solution is decolorized with charcoal and cooled in an ice bath. The yield of the crystalline salt is 9.2 g. (59.4%), M.P. 207–210° C. dec.

The free base is prepared by dissolving the acid addition salt in hot water, the solution is cooled and treated with an excess of 15% sodium hydroxide. The mixture is kept in an ice bath until the precipitate solidifies. It is then filtered, washed with water and recrystallized from hot ethanol, M.P. 134–135° C.

EXAMPLE 4

*N-[4-(4-Phenyl-5,6-Dihydro-1(2H)-Pyridyl)Butyl]-3,4,5-Trimethoxycinnamamide*

When 8.2 g. (0.0356 mole) of 1-(4-aminobutyl)-4-phenyl-1,2,3,6-tetrahydropyridine, dissolved in 75 ml. of benzene, is reacted with 9.14 g. (0.0356 mole) of 3,4,5-trimethoxycinnamoyl chloride dissolved in 150 ml. of benzene as described in Example 3, the hydrochloride salt of the product is isolated in 77% yield, M.P. 160° C. dec.

The above hydrochloride, 6.0 g., is suspended in water and acidified with 6 N hydrochloric acid, warmed on a steam bath, and filtered. The filtrate is made alkaline with sodium hydroxide and extracted with chloroform. The combined chloroform extracts are extracted with hydrochloric acid and the combined acidic extracts are made alkaline and again extracted with chloroform. The combined chloroform extracts are washed with water, dried over anhydrous magnesium sulfate and evaporated. The residue solidifies on standing and is recrystallized from 20 ml. of ethanol. The product, 2.1 g., after a second recrystallization, melts at 130–132° C.

The above base, 1.3 g. (0.0029 mole) in 10 ml. ethanol, is treated with one equivalent of alcoholic hydrogen chloride and diluted with 60 ml. of ether. The hydrochloride, 1.3 g., is obtained (91% yield from purified base), M.P. 183–186° C.

EXAMPLE 5

*4-Phenyl-5,6-Dihydro-1(2H)-Pyridylacetonitrile*

4-phenyl-1,2,3,6-tetrahydropyridine in 200 ml. of benzene is stirred and heated to reflux while 11.7 g. (0.155 mole) of α-chloroacetonitrile in 50 ml. benzene is added dropwise. The reaction mixture is heated under reflux for 6 hours and allowed to stand overnight. The reaction mixture is filtered and the filtrate is evaporated. The residue is recrystallized from 175 ml. methanol to give 13.0 g. of product, M.P. 91–93° C. An additional 12.0 g. of product crystallizes from the mother liquor on evaporation to 75 ml. The total yield is 25 g. (82%), M.P. 92–93° C.

EXAMPLE 6

*1-(2-Aminoethyl)-4-Phenyl-1,2,3,6-Tetrahydropyridine*

4-phenyl-5,6-dihydro-1(2H)-pyridylacetonitrile, 20 g. (0.10 mole) in 100 ml. anhydrous tetrahydrofuran is reduced with 5.7 g. (0.15 mole) of lithium aluminum hydride in 250 ml. anhydrous tetrahydrofuran as described in Example 2. The crude product, 20 g. (98% yield), is converted directly to the amide.

EXAMPLE 7

*N-[2-(4-Phenyl-5,6-Dihydro-1(2H)-Pyridyl)Ethyl]-3,4,5-Trimethoxybenzamide*

A mixture of 3.1 g. (0.015 mole) of 1-(2-aminoethyl)-4-phenyl-1,2,3,6-tetrahydropyridine in 50 ml. chloroform and 1.2 g. (0.030 mole) sodium hydroxide in 50 ml. water is stirred in an ice bath and treated dropwise with a solution of 3.7 g. (0.016 mole) of 3,4,5-trimethoxybenzoyl chloride in 50 ml. chloroform. The mixture is stirred for an additional hour at room temperature and the phases separated. The chloroform extract is washed several times with water, dried over anhydrous magnesium sulfate and evaporated. The residue, a glass, 6.0 g. (98% yield) is triturated with 5 ml. ethanol and the crystalline product recrystallized from 20 ml. ethanol, M.P. 148–153° C. This product, 1.4 g. (0.0035 mole) in 10 ml. ethanol, is treated with one equivalent of alcoholic hydrogen chloride and the solution is allowed to stand 24 hours. The crystalline hydrochloride is collected, and recrystallization from 5 ml. ethanol with the addition of ether gives 1.1 g. of product (71% yield from purified base), M.P. 174–176° C.

What is claimed is:

1. A member of the class consisting of compounds of the formula:

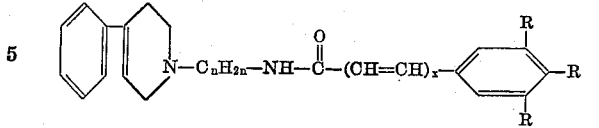

wherein R is lower alkoxy, $x$ has a value selected from the group consisting of 0 and 1, and $n$ is an integer from 2 to 5, and the non-toxic acid-addition salts thereof.

2. N-[4-(4-phenyl-5,6-dihydro-1(2H) - pyridyl)butyl]-3,4,5-trimethoxybenzamide.

3. N-[4 - (4-phenyl-5,6-dihydro-1(2H)-pyridyl)butyl]-3,4,5-trimethoxycinnamamide.

4. N-[2-(4-phenyl-5,6-dihydro-1(2H) - pyridyl)ethyl]-3,4,5-trimethoxybenzamide.

References Cited in the file of this patent

UNITED STATES PATENTS

| | | |
|---|---|---|
| 2,870,145 | Perron | Jan. 20, 1959 |
| 2,967,182 | Pohland | Jan. 3, 1961 |
| 3,005,821 | Hayao | Oct. 24, 1961 |

OTHER REFERENCES

Degering: "An Outline of Organic Nitrogen Compounds," University Lithoprinters, Ypsilanti, Michigan, 1950, pages 491–2.